(No Model.)
W. A. WICKS.
APPARATUS FOR PRESERVING FRUITS.
No. 342,412. Patented May 25, 1886.
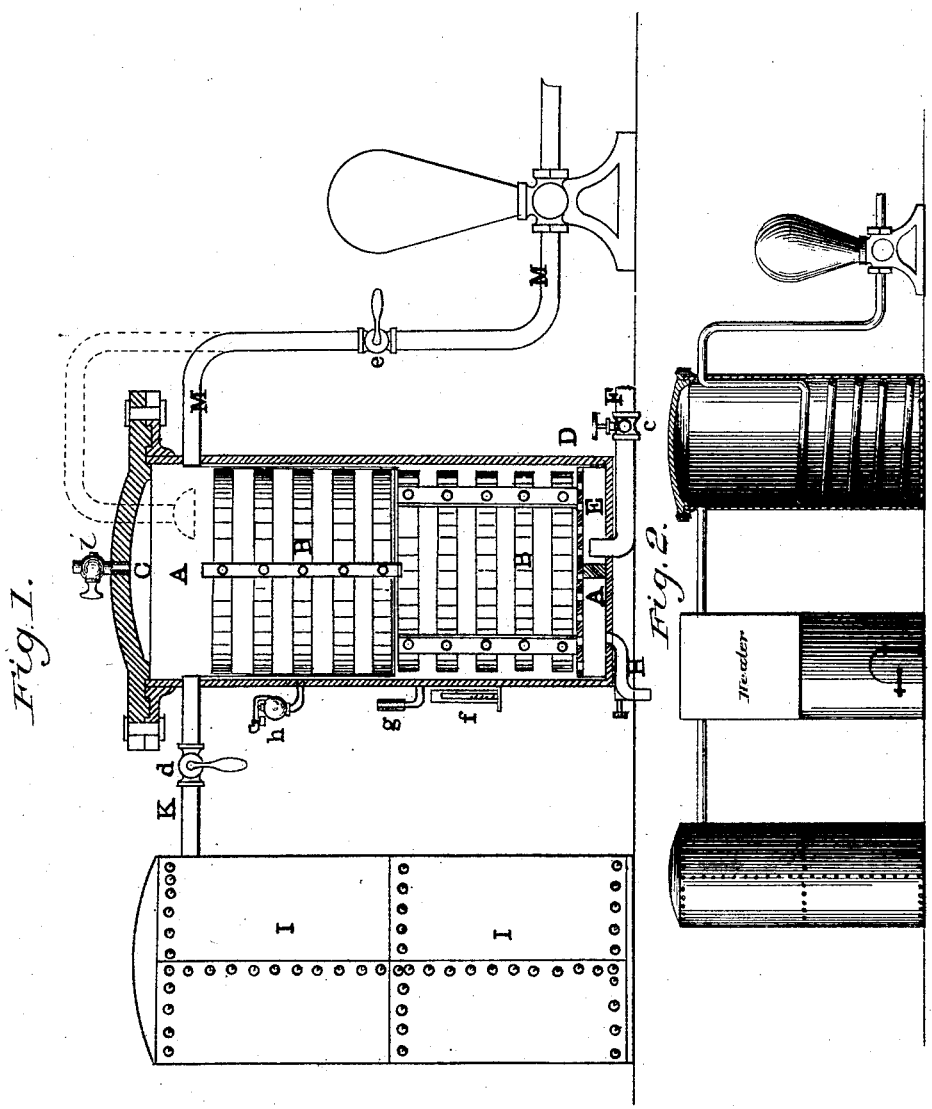

UNITED STATES PATENT OFFICE.

WILLIAM A. WICKS, OF BALTIMORE, MARYLAND.

APPARATUS FOR PRESERVING FRUITS.

SPECIFICATION forming part of Letters Patent No. 342,412, dated May 25, 1886.

Application filed November 6, 1883. Serial No. 111,034. (No model.)

*To all whom it may concern:*

Be it known that I, WILLIAM A. WICKS, of the city of Baltimore, and State of Maryland, have invented a new and useful Improvement in Apparatus for Preserving Fruits, Vegetables, Meats, &c., of which the following is a full description.

My invention relates to that form of apparatus by which canned fruits, &c., are placed in a steam-tight cylinder, into which steam or hot water is introduced until the required heat and pressure are obtained, and allowed to remain therein until the contents are cooked.

It is usual and customary in preserving meats or vegetables in apparatuses of the above description to allow the steam to enter and remain in the vessel until the provisions are sufficiently cooked, and then shut off the inlet of the steam and open a cock to allow it to escape. The top of the cylinder is then removed and the crates with the cans taken out. While the steam is in the cylinder surrounding the cans, a steam-pressure is generated within the cans equal to and often exceeding the pressure surrounding them. This pressure occurs while the goods in the cans are cooking, and when the pressure within the cans is greater than that within the cylinder, and surrounding them, the heads and bottoms of the cans are bulged outwardly, causing the joints to break and leak, in consequence of which the articles of food packed therein become spoiled. When the goods have been cooked with an even pressure preserved inside and outside of the cans, they are again liable to be bulged out when the pressure is removed from the cylinder and while cooling off, by the excess of pressure within them.

The object of my invention is to maintain an equalized pressure inside and outside of the cans while their contents are being cooked, and also while they are cooling within the cylinder, and at the same time to provide a rapid method of cooling them; and these objects I accomplish by the following-described apparatus.

Figure 1 is a general view of the apparatus with the kettle in section. Fig. 2 illustrates a form of apparatus with the air-pipe passing through or over a fire, in order to heat the air before introducing it into the cylinder, if desired. A cooling-coil is also shown in the kettle.

In the drawings, A is a cylinder into which are introduced the baskets or crates B. These crates contain the filled cans with their contents ready to be cooked. The cylinder is closed by the steam-tight cover C. The can-holding crate rests upon the perforated false bottom D, leaving the space E below.

F is a steam inlet-pipe connecting the cylinder with a boiler or other steam receptacle or generator. This pipe F is provided with the cock $c$, to regulate the supply of steam to the cylinder.

H is a drain-pipe to let off the steam and water when required. This pipe is provided with the cock $a$.

I is a tank or receptacle for compressed air, connected with the cylinder by means of the pipe K. This pipe is provided with the cock $d$, to regulate the passage of the compressed air to the cylinder.

M is a pipe connected with the cylinder and communicating with a supply of water under pressure. This pipe is connected, preferably, near the top of the cylinder, or it may be through the cover C. It may also be provided at its ends with a rose or other device, for spraying the water over the cans. It is also provided with a cock, $e$, to regulate the supply of water.

$f$ is a thermometer, to indicate the temperature of the steam within the cylinder.

$g$ is a pressure-gage, to indicate the pressure within the cylinder.

$i$ is a cock or faucet in the top of the cylinder, to allow the steam within to escape, when desired; and $h$ is a safety-valve regulated as required.

The operation is as follows: The crate B, holding the filled cans, is deposited within the cylinder and the cylinder closed by the cover C. The cock $c$ in the steam-pipe F is opened and the cylinder filled with steam until the thermometer indicates the proper temperature, while the steam-gage $g$ will indicate the pressure within the cylinder and surrounding the cans. The cock $d$ in the pipe K is then cautiously opened, admitting compressed air to the cylinder until the pressure within and surrounding the cans becomes somewhat higher than the steam-pressure therein, corresponding with the temperature of the steam, when a pressure on the outside of the cans is thus maintained to a degree sufficient to prevent the bulging of the heads and bottoms of the cans. It is allowed to remain in this condition until the provisions are sufficiently cooked. If desired, either warm or cold air may be introduced into the cylinder during the cooking process, as preferred by the operator. When the contents of the cans have been sufficiently cooked, the cock $e$ in the pipe M is opened, admitting a regulated supply of water under pressure. The supply of compressed air is also increased, so as to supply the pressure on the cans, which becomes reduced by the condensation of the steam in the cylinder, thus cooling the cans and keeping up the pressure thereon until they are in condition to be removed.

During the operation of cooking it may be necessary to open or close more or less frequently the cocks $c$ and $d$ in the pipes F and K, also the cock $i$ in the top of the cylinder and $a$ in the drain-pipe. From the time at which the steam is shut off from the cylinder until the cans are cool enough to be removed attention should be paid to the external pressure on the cans to prevent the bulging of the heads.

The above method describes the use of steam for cooking. There are other methods in common use—the hot-water method and the hot water and steam combined. My invention is applicable to any or all of these methods, and any of the gases may be substituted for the compressed air. It will also be seen that the water for cooling may be used to condense the steam entering the cylinder, by dispensing with the means for spraying and providing the cylinder with the ordinary internal coil and allowing the water to circulate through the coil.

What I claim is—

In an apparatus for cooking and preserving canned food, the cooking-cylinder A, in combination with the tank I, for holding compressed air or its equivalent, and means for supplying water under pressure and provided with means for regulating and controlling the introduction of the air and water into the cylinder, substantially as and for the purposes set forth.

WILLIAM A. WICKS.

Witnesses:
CHAS. H. KOYL,
SAML. I. HOUGH.